Nov. 16, 1965     W. A. LOEB     3,217,538
ELECTRONIC HEAT FLUX METER
Filed Nov. 4, 1963
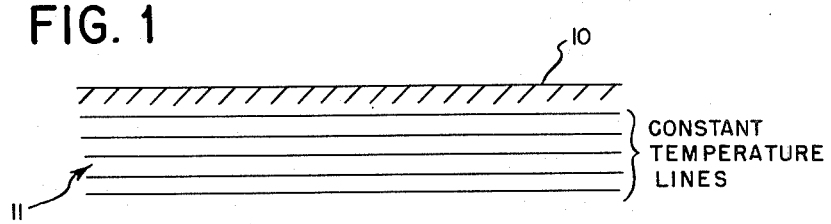
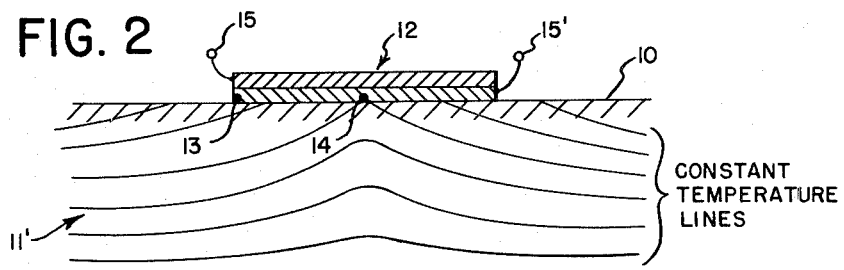
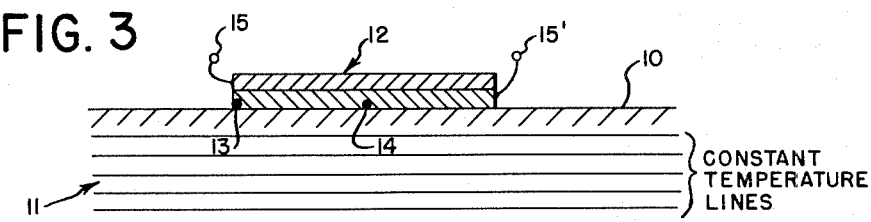
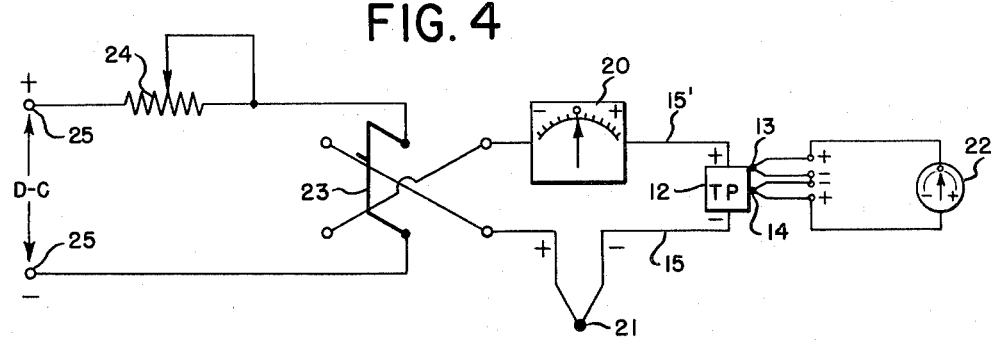
INVENTOR
WILLIAM A. LOEB
ATTORNEYS

United States Patent Office

3,217,538
Patented Nov. 16, 1965

3,217,538
ELECTRONIC HEAT FLUX METER
William A. Loeb, Chappaqua, N.Y., assignor to United Nuclear Corporation, White Plains, N.Y., a corporation of Delaware
Filed Nov. 4, 1963, Ser. No. 321,215
5 Claims. (Cl. 73—190)

This invention relates to apparatus for measuring heat flux and in particular to electronic apparatus utilizing thermoelectric elements for this purpose.

The measurement of the rate of heat flow from a medium has previously been accomplished by the disposal of heat sensing devices in the medium itself. Measurements made utilizing this general technique have been found to contain errors due in part to the disturbance of the heat flux and the temperature distribution within the medium at the time the measurements are taken.

The present invention provides a relatively simple and inexpensive meter that measures heat flux from a medium without disposing any of the sensing or measuring apparatus within the medium. Further, the apparatus is capable of measuring heat flux accurately for mediums having temperatures either above or below ambient temperature.

In accordance with the present invention, accurate measurement of heat flux is effected by mounting an electrically energized thermoelectric element on the external surface of the medium from which heat flux is to be measured. A pair of balanced thermocouples are connected in electrical opposition and mounted in spaced relationship on the surface of the thermoelectric element which contacts the surface of the heat conducting medium.

Placement of the thermoelectric element on the external surface of the medium to be measured changes the conductance of the medium surface, thereby distorting the isothermal lines in the medium and changing the heat flux from the medium. The foregoing disturbance produces a change in surface temperature distribution which is sensed and indicated by a meter provided to measure the differential output signal of the spaced thermocouples connected in electrical opposition.

The distorted isothermal lines are returned to a normal undistorted state by applying a required magnitude of D.-C. voltage of proper polarity across the thermoelectric element to either heat or cool the contact surface and effectively restore the isothermal lines to their original configuration. The normal state is indicated when the meter indicates zero output signal from the thermocouples. When the thermocouples are balanced, the original heat flow pattern is restored and the measured value of the D.-C. current supplied to the thermoelectric element is utilized as a direct measure of the heat flux from the medium.

Since the apparatus of the present invention does not require the direct reading of small voltages generated by the thermocouple heat sensors, a significant source of measurement error is substantially eliminated. As indicated above, the present apparatus also substantially eliminates measurement error in the prior art devices due to the disturbance caused in the medium by the disposal of a part of the sensor apparatus in the medium or caused by taking measurements at a time when the heat flux in the medium is disturbed. Although the present meter does contact the surface of the heat conducting medium, measurements are so taken as to maintain the isothermal lines existent in said medium in substantially the same configuration as would exist without the contact of the meter.

Further features and advantages of the invention will be best understood from the following description of a specific embodiment, when read in connection with the accompanying drawing in which:

FIG. 1 shows a partial side view in section of the isothermal configuration of an undisturbed heat conducting medium;
FIG. 2 shows a thermoelectric element mounted on the surface of the heat conducting medium in FIG. 1;
FIG. 3 shows the isothermal configuration in the heat conducting medium at the time of measurement; and
FIG. 4 is a schematic diagram of the electrical circuit of a preferred embodiment of the present invention.

Referring to FIG. 1 the isothermal or constant temperature lines 11 are shown running parallel to the surface 10 of the medium from which heat flux is to be measured. Isothermal lines do not physically exist in the medium but are well known in the art as convenient and accurate representations of temperature distribution.

The medium as shown in FIG. 1 is in a steady state equilibrium condition with the time rate of flow of heat from the medium itself undisturbed. It is assumed that the losses normally occurring during equilibrium, such as from radiation, are substantially constant across the medium surface. This assumption permits the isothermal lines to be shown substantially parallel to surface 10.

When thermoelectric element 12 contacts surface 10, the effective surface conductance of the medium is changed. Thus a change in heat flow occurs across surface 10 as the losses at the area of contact with 12 are no longer limited to those of normal operation, such as radiation. The direction of heat flow across the area of contact depends on whether the ambient temperature is higher or lower than the temperature at surface 10. The change in surface conductance changes the isothermal configuration of the medium as shown in FIG. 2. Isotherms 11' now enter and leave thermoelectric element 12, corresponding to the situation where the ambient temperature is lower than the medium temperature. However, as the net change of temperature along a particular cross-section of thermoelectric element 12 is substantially zero, the maximum disturbance of the isotherms occurs over either one-half of the corresponding dimension of said element. Advantageously thermoelectric element 12 is a lead-telluride thermopile and is hereinafter referred to as thermopile 12.

Thermocouples 13 and 14 are mounted in spaced relationship on the surface of thermopile 12 so as to contact surface 10 when the thermopile is placed on said surface. As shown in FIG. 2, thermocouples 13 and 14 are mounted near the edge and geometric center respectively of thermopile 12 in order to experience the maximum temperature disturbance caused by the contact of said thermopile. The thermocouples can be located any convenient distance apart but must not be located on a common isotherm. It is to be noted that if said thermocouples are each equispaced from the center of a thermopile having a circular cross-section, for example, no net temperature difference will be experienced and the apparatus will not function.

As shown in FIG. 4, thermocouples 13 and 14 are connected in electrical opposition. When both thermocouples sense equal temperatures, equal and opposite signal voltages are produced and the resultant output voltage is zero. When the thermocouples are exposed to to different temperatures, a net positive or negative output voltage is produced corresponding to the difference in temperatures at the different points on the surface 10.

Thermopile element 12 is connected in series by leads 15 and 15' with an adjustable, reversible polarity D.-C. current source. While FIG. 2 shows thermopile 12 to be composed of two dissimilar metals to form an area thermocouple as is well known in the art, it is understood that a plurality of individual series connected thermocouples formed into a single unit might also be employed.

When current flows through the thermoelectric junction of thermopile 12, a heating or cooling effect is produced depending upon the direction of current flow. The generation or absorption of heat at the junction of two dissimilar metals is known as the Peltier effect.

The Peltier generation or absorption of heat is utilized as indicated above to decrease the change in the medium surface conductance due to the contact of thermopile 12. As the flow of current through the junction increases, a condition is reached where the surface conductance, and therefore the isothermal configuration, is returned to its original steady-state value. This is shown in FIG. 3. When the original condition has been attained, there is substantially no temperature difference existing between thermocouples 13 and 14.

The Peltier effect, as is known in the art, causes no physical or chemical change in the thermopile. The absorption or generation of heat is substantially due to a change in the energy of the electron flow across the thermopile junction. Therefore to balance this energy change and to maintain the thermopile circuit energy in substantially thermal equilibrium, a similar metallic junction 21 is connnected in series with thermopile 12 but in an opposing manner as shown in FIG. 4. Hence, the energy gained or lost in thermopile 12 is counter-acted in effect by an equal but opposite change at reference junction 21.

D.-C. input voltage is supplied to terminals 25 and adjustment of variable resistance 24 varies the magnitude of the D.-C. current flowing in the circuit. Switch 23 is provided to reverse the polarity of the D.-C. current flowing through thermopile 12. Ammeter 20 is connected in series with thermopile 12 and reference junction 21, thereby completing the energizing circuit of the thermopile. Ammeter 20 is advantageously calibrated to read directly in terms of heat flux from the medium rather than current in the thermopile circuit.

The differential output voltage from thermocouples 13 and 14 is connected to voltmeter 22 as shown. Since there is no requirement that the thermocouples sense and read absolute temperature values of the material, voltmeter 22 is used only to indicate potential difference between the thermocouple output signals and therefore any convenient null indicating device may be used.

During normal operation, thermopile 12 is brought into contact with the medium from which heat flux is to be measured. A potential difference will then exist at the output terminals of thermocouples 13 and 14 as indicated on voltmeter 22. Current is then supplied to themopile 12 by closing switch 23.

The current is then varied by adjusting resistance 24 until a null reading is obtained on voltmeter 22. If the increasing of current to thermopile 12 causes the voltmeter to move away from the null position, switch 23 should then be reversed to reverse the polarity of the current. Further adjustment will then result in a null reading on voltmenter 22.

A null reading indicates that the conditions shown in FIG. 3 have been reached and a reading of the calibrated ammeter provides an accurate indication of the heat flux from the medium under measurement.

This invention has been described in connection with a preferred embodiment thereof. However, it will be understood that many modifications may be made within the spirit and scope of the invention as defined in the appended claims.

I claim:

1. Apparatus for measuring heat flux which comprises first electrically energizable thermoelectric means for contacting the surface of the medium from which heat flux is to measured, means for sensing a temperature difference between spaced points on the surface of said thermoelectric means when said surface is in contact with the surface of the medium, means connected to said temperature sensing means for indicating when a temperature difference exists, second electrically energizable thermoelectric means for substantially counteracting the energy change produced by the contacting thermoelectric means and connected thereto, and means for measuring the electrical energy supplied to said first thermoelectric means.

2. Apparatus in accordance with claim 1 in which the temperature sensing means is a plurality of thermocouples mounted in contact with said first thermoelectric means to sense the existence of a temperature difference between spaced points on the surface of said first thermoelectric menas contacting the medium surface.

3. Apparatus in accordance with claim 1 in which the temperature sensing means is a pair of thermocouples connected in electrical opposition and located in contact with said first thermoelectric means at spaced points corresponding to different isotherms.

4. Apparatus for measuring heat flux which comprises a first thermopile exhibiting the Peltier effect for contacting the surface of the medium from which heat flux is to be measured, a pair of thermocouples connected in electrical opposition and mounted in said thermopile, said thermocouples mounted to contact the surface of the medium from which heat flux is to be measured at points corresponding to different isotherms, means for indicating when said pair of thermocouples are electrically unbalanced, means for supplying direct current to said first thermopile, a second thermopile connected to said current means and said first thermopile in Peltier opposition to said first thermopile, and means for measuring the current supplied to said thermopiles by said current means when said indicating means is at a null position.

5. Apparatus in accordance with claim 4 in which the means for supplying direct current is a reversible polarity direct current source.

References Cited by the Examiner
UNITED STATES PATENTS 3,170,117   2/1965   Berning et al. _____ 73—193 X RICHARD C. QUEISSER, *Primary Examiner.*

DAVID SCHONBERG, *Examiner.*